United States Patent [19]

Copeland

[11] 3,862,909

[45] Jan. 28, 1975

[54] FLUIDIZED BED AUTOGENOUS COMBUSTION AND PYROLYSIS OF AQUEOUS EFFLUENTS TO PREPARE ACTIVATED CARBON

[75] Inventor: George G. Copeland, Western Springs, Ill.

[73] Assignee: Copeland Systems Incorporated, Oak Brook, Ill.

[22] Filed: Sept. 5, 1972

[21] Appl. No.: 286,604

[52] U.S. Cl. ............... 252/421, 162/30, 201/2.5, 201/25, 201/31, 252/425, 252/445, 423/449
[51] Int. Cl. ........................................... C01b 31/08
[58] Field of Search ............... 252/421, 445, 425; 423/449, 206, 207; 162/30, 36; 201/25

[56] References Cited
UNITED STATES PATENTS

| | | | |
|---|---|---|---|
| 1,483,160 | 2/1924 | Creighton | 252/445 |
| 1,623,598 | 4/1927 | Jacobs | 252/421 |
| 1,634,480 | 7/1927 | Wickenden et al. | 252/445 |
| 2,391,566 | 12/1945 | Goodell | 423/207 |
| 3,296,064 | 1/1967 | Cann | 162/30 |
| 3,309,262 | 3/1967 | Copeland et al. | 423/207 |
| 3,595,806 | 7/1971 | Prahacs et al. | 252/421 |
| 3,635,790 | 1/1972 | Heath | 162/30 |
| 3,701,824 | 10/1972 | Prahacs et al. | 252/421 |

*Primary Examiner*—Daniel E. Wyman
*Assistant Examiner*—P. E. Konopka
*Attorney, Agent, or Firm*—Merriam, Marshall, Shapiro & Klose

[57] ABSTRACT

A pollution controlling aqueous waste treatment method, especially suitable for use in connection with pulp and paper mill operations, by which method waste effluents containing carbonaceous substances are subjected to a controlled oxidation process in a fluid bed reactor to effect autogenous combustion and pyrolysis of carbonaceous substances to activated carbon products suitable for such standard uses as purification and heat generation.

3 Claims, 1 Drawing Figure

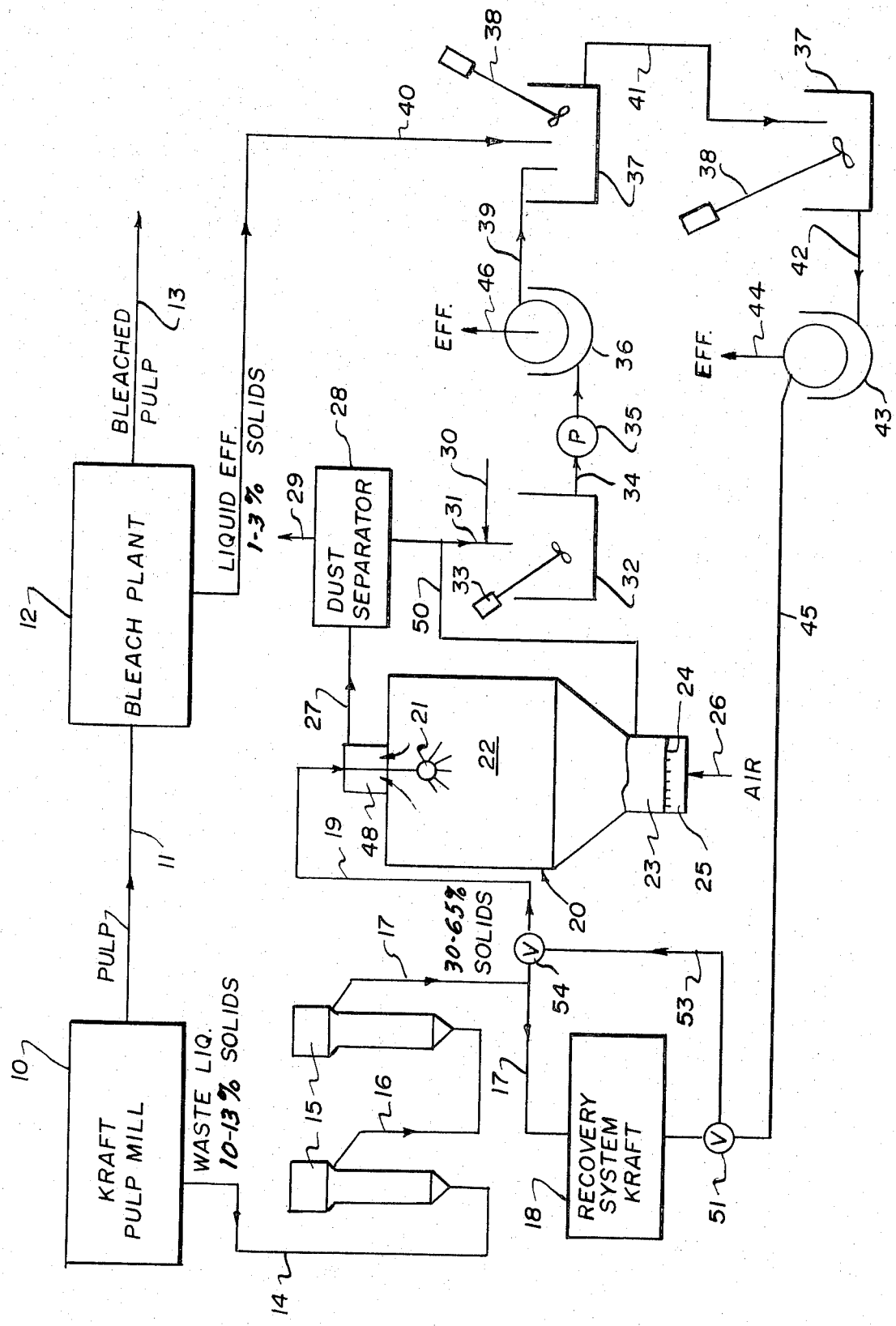

FLUIDIZED BED AUTOGENOUS COMBUSTION AND PYROLYSIS OF AQUEOUS EFFLUENTS TO PREPARE ACTIVATED CARBON

The present invention relates generally to pollution controlling methods for treatment of aqueous waste materials containing carbonaceous substances and more particularly to methods for treatment of such wastes to effect the formation of useful activated carbon products from the carbonaceous substances therein.

Generally stated, the methods of the invention include subjecting the wastes to a controlled oxidation process in a fluidized bed reactor to effect conversion of carbonaceous substances to activated carbon products by autogenous combustion and pyrolysis and recovering the activated carbon products so derived. Prior to treatment in a fluidized bed reactor, the aqueous wastes may be subjected to standard solids concentration processes. Recovery of activated carbon products may be by flotation.

The methods of the invention are especially suitable for use in treatment of wastes from pulp and paper mill operations, whereby bark and other carbonaceous mill wastes may be converted to activated carbon products useful in purification of effluents from associated bleach plant operations. The methods are also suitable for treatment of aqueous wastes from other operations which might contain such carbonaceous substances as sawdust, garbage and petroleum derivatives.

The activated carbon products derived from the practice of the invention are particularly useful in stripping organic matter, color, B.O.D. and C.O.D. from waste effluent streams so that the effluents are rendered safe for introduction into existing natural waterways. Activated carbon products so derived from otherwise wasted carbonaceous materials are quite inexpensive in comparison to standard commercial products.

BRIEF DESCRIPTION OF THE DRAWING

Further aspects and advantages of the present invention will become apparent upon consideration of the following detailed description together with the drawing wherein:

FIG. 1 is a simplified flow diagram of a kraft pulp system including a pulp mill, bleach plant and kraft recovery system along with apparatus suitable for practice of the methods of the invention.

DETAILED DESCRIPTION

The method of the present invention may be best understood and appreciated when considered in relation to their use in kraft pulp systems such as that illustrated in FIG. 1.

In the kraft pulp system illustrated, there is provided a kraft pulp mill 10 of customary construction. Pulp produced is transferred as indicated by the line 11 to a bleach plant 12 in which the pulp is bleached and from which the kraft bleach pulp is removed as indicated by the line 13.

The pulp mill 10 produces an aqueous waste liquor comprising carbonaceous waste materials, such as lignin, and inorganic salts either derived from the wood or employed during the pulping process. Ordinarily the aqueous liquor contains from about 10 to about 13 percent solids and in the customary system is transferred through line 14 to a series of evaporators 15, 15.

As the waste liquor passes through the evaporators 15 as indicated by the line 16, the liquor is concentrated to a solids content of about 30-65 weight percent, for example, with the remaining 35-70 weight percent being essentially water. This concentrated waste liquor is customarily transferred, as by a line 17, to a kraft recovery system 18 which normally uses a combustion process to oxidize the kraft waste and recover the pulping chemicals.

According to the present invention at least a portion of the concentrated (about 30-40 weight percent solids) waste liquor from the line 17 is diverted as indicated by the branch line 19 and directed into a fluidized bed reactor 20 of the type described in prior U.S. Pat. No. 3,309,262, issued Mar. 14, 1967.

In this reactor 20 the portion of the concentrated liquor from line 19 is forced through a spray head 21 located in the reactor freeboard space 22 onto the fluid bed 23 of solid material which is stable at the temperature of reaction. The fluid bed 23 is supported on a gas pervious plate 24 which separates the wind box or plenum chamber 25 from the fluid bed 23.

The particles in the bed 23 are maintained in a fluidized condition by means of a gas that contains oxygen, such as air as illustrated, being directed up through the bed. In the illustrated embodiment fluidization is accomplished by pumping air from a line 26 into the space 25 for flow upwardly through the supporting plate 24, through the bed 23 and into the freeboard space 22. This air may be preheated before it is passed through the bed.

Due to the concentrated condition of the waste liquor sprayed onto the particles in the bed 23 for contact with the oxygen of the air, combustion of carbonaceous substances in the bed is autogenous, and no fuel need be introduced except, perhaps, for a brief period on start-up of a cold bed.

When liquors such as kraft (sulfate) or sodium base sulfite liquors are treated according to the method, the particles in the fluid bed 23 are preferably a mixture of sodium carbonate and sodium sulfate, which salts are the end product of oxidation of the inorganic materials contained in those liquors. When solid wastes such as bark or garbage constitute the principal source of carbon, the fluid bed 23 may consist of inert particles such as sand.

According to the process of the invention, the water content of the feed is preferably such that autogenous combustion of carbonaceous materials is possible while temperatures in the fluid bed zone 23 remain below the melting or fusion point of the inorganic salts which may make up the particles of the bed. As an example, kraft liquors injected into the reactor 20 at 32 percent solids will burn autogenously given a temperature of about 1,300°F. in the fluid bed 23. In the course of injection of liquor at about 32 percent solids through the freeboard space 22, considerable heat exchange is experienced between the exiting gases and the incoming feed material, resulting in a lowering of exit gas temperature to 1,150°F.

The rate of feed to reactor 20 is controlled to stoichiometric requirements of the air passing through the system so that there is substantially no oxygen present in the freeboard zone 22. As a practical matter, oxygen in the freeboard space 22 is ordinarily less than 2 percent by volume.

Evaporation of water from the feed in the freeboard space provides the atmosphere of water vapor, which at 1,150°F. in a deficiency of oxygen, promotes pyrolysis of particles of incompletely burned carbonaceous substances to activated carbon products.

Particles so pyrolyzed are fine in size, thus producing maximum surface for subsequent activated carbon use. The gaseous combustion products with entrained activated carbon products and inorganic salts are carried from the top of the reactor through a conduit 48.

The mixed gases, inorganic salts, and activated carbon particles are directed by a line 27 into a dust separator 28 which may be of the cyclone type. The gases, principally nitrogen, carbon dioxide and oxygen, are vented to the atmosphere or carried to scrubbing equipment and/or heat recovery devices (not shown) through a vent line 29.

A portion of the activated carbon particles and inorganic salts may be directed through a line 50 to the reactor bed 23 if desired, and the balance mixed with water from the line 30. The resulting aqueous slurry of activated carbon products is directed through a line 31 into a mixer tank 32 where it is thoroughly mixed by a motor driven mixer 33. In this mixer tank 32, the inorganic salts are dissolved in water, the carbon remaining in an insoluble state. From tank 32, the mixture is transferred through a line 34 by a pump 35 into a vacuum filter 36. In this filter, which is of customary construction, the carbon solids are separated and the inorganic materials are discharged in the filtrate. The activated carbon products are thereafter directed to a series of mixer tanks 37, 37 for use in purification of effluents from bleach plant 12. Each mixer 37 is provided with a motor driven agitator 38 similar to the mixer agitator 33.

The activity of the carbon products recovered is a function of the controlled conditions under which it is produced as described above. Products derived from treatment of sulfate and sulfite liquor mill wastes in the above manner generally have an activity of about 30-40 percent of that of commercially available activated carbon. Activity of the products can be increased to that of commercial carbon by activation in a separate step consisting of treatment in a fluid bed reactor where there is exposure to temperatures of 1200°-1600°F. in an oxygen deficient atmosphere. An alternative procedure for deriving additional activity would be treatment with activating salts such as zinc chloride, caustic soda, and the like, according to known processes.

It should be noted that high activity is not necessary where activated carbon products are employed to purify a bleach plant effluent and recycled to existing combustion processes. Low activity can be offset by using more activated carbon per gallon of liquid or alternatively increasing the contact time in mixers 37.

Where concentrated aqueous waste materials containing bark and wood and little or no inorganic salts are treated according to the present invention, the activated carbon products derived may have an activity 80-95 percent of that of commercial carbon.

In the series of mixer tanks 37 the carbon solids conveyed from the filter 36 as indicated by the line 39 are mixed with liquid effluent from the bleach plant 12 flowing through a line 40 into the first mixer tank 37 and from there into successive mixers 37. In this thorough mixing of the activated carbon solids with the liquid effluent from the bleach plant, the activated carbon or "char" absorbs oxygen demanding pollutants and removes B.O.D. (biological oxygen demand) and C.O.D. (chemical oxygen demand) as well as color.

As an example, when 200 milliliters of waste paper machine white water was treated for 24 hours (with agitation) with 5 grams of carbon, produced by the method of this invention and subsequently further activated at 1,600°F. in a carbon dioxide-water atmosphere, 92 percent of B.O.D., 90 percent of C.O.D. and 99 percent of the color was absorbed onto the carbon.

From the last mixer tank 37 the mixed liquid effluent and carbon is conveyed as by a line 42 to another filter 43 which is also of the customary vacuum type. Here the clarified filtrate is directed to a place of disposal as through a line 44 and the filtered solids which now may contain 90 percent or more of each of the B.O.D. and C.O.D. and up to 100 percent of the color from the effluent may be conveyed as indicated by the line 45 to the recovery system 18 for use as fuel. If desired, this loaded carbon could be diverted by valve 52 into line 53 by way of valve 54 for burning in the fluid bed reactor 20.

Apart from use in association with kraft mill operations, when concentrated aqueous wastes containing 40-60 percent solid carbonaceous materials such as bark or sawdust are treated according to the invention, introduction into a fluid bed reactor may be accomplished by standard pneumatic or mechanical means. Activated carbon products produced may be recovered and employed in a manner similar to that described above.

Irrespective of the origin of the waste materials treated according to the invention, temperature conditions within the fluid bed reactor are regulated in the customary manner to provide a temperature in the bed of 900°-2,000°F, and a temperature in the freeboard space of 900°-1,200°F.

Obviously modifications and variations of the above described invention will occur to those skilled in the art upon consideration of the description thereof. Therefor only those limitations as are set out in the appended claims should be placed thereon.

What is claimed is:

1. A method for treating aqueous wastes containing organic carbonaceous materials, said method comprising:
   introducing an aqueous waste containing organic carbonaceous materials by spraying into the freeboard space of a fluid bed reactor having a particle bed and a freeboard space thereabove wherein the particles of said bed are fluidized by a gas containing oxygen in such stoichiometric amount as is necessary for autogenous incomplete combustion of the organic carbonaceous materials in said waste at temperatures of from about 900° to about 2,000°F.;
   maintaining in said freeboard space a substantially oxygen-free atmosphere comprising water vapor at a temperature of from about 900° to about 1,200°F. for pyrolysis of the products derived from incomplete combustion of carbonaceous materials in said waste to form activated carbon products in said freeboard space;
   removing a gaseous effluent containing activated carbon from said freeboard space; and separating and recovering said activated carbon from the gaseous effluent.

2. The method of claim 1 further including the step of concentrating said aqueous wastes to a carbonaceous material solids content of from about 30 to about 65 percent by weight prior to introduction into said fluid bed reactor.

3. The method of claim 1 wherein said recovering step includes flotation of activated carbon products.

* * * * *